United States Patent [19]

Holzmann et al.

[11] Patent Number: 5,265,948
[45] Date of Patent: Nov. 30, 1993

[54] HYDRAULIC ANTI-LOCK VEHICLE BRAKE SYSTEM FOR A VEHICLE

[75] Inventors: Roland Holzmann, Stuttgart; Wolf-Dieter Jonner, Beilstein Schmidhausen, both of Fed. Rep. of Germany

[73] Assignee: Robert Bosch GmbH, Stuttgart, Fed. Rep. of Germany

[21] Appl. No.: 902,348

[22] Filed: Jun. 22, 1992

[30] Foreign Application Priority Data

Aug. 24, 1991 [DE] Fed. Rep. of Germany ....... 4128120

[51] Int. Cl.$^5$ .............................................. B60T 13/18
[52] U.S. Cl. .................................. 303/116.1; 303/900
[58] Field of Search ............... 303/116.1, 116.2, 113.1, 303/113.2, 119.1, 115.1–115.4, 900

[56] References Cited

U.S. PATENT DOCUMENTS

| 3,731,980 | 5/1973 | Fink et al. | 303/900 X |
| 3,866,983 | 2/1975 | Kondo | 303/116.1 |
| 4,099,793 | 7/1978 | Iio | 303/116.4 |
| 4,640,558 | 2/1987 | Nomura et al. | 303/900 X |
| 4,936,637 | 6/1990 | Adachi et al. | 303/115.4 |

FOREIGN PATENT DOCUMENTS

| 4001421 | 7/1991 | Fed. Rep. of Germany | 303/113.2 |
| 2-144251 | 6/1990 | Japan | 303/116.1 |
| 2214251 | 8/1989 | United Kingdom | 303/113.2 |

OTHER PUBLICATIONS

Bosch Technische Berichte, English special edition (Feb. 1982), pp. 76,77.

Primary Examiner—Robert J. Oberleitner
Assistant Examiner—Alfred Muratori
Attorney, Agent, or Firm—Edwin E. Greigg; Ronald E. Greigg

[57] ABSTRACT

A known vehicle brake system having an anti-lock system has at least one return pump in this anti-lock system, by means of whose pumping pressure a throttle valve located between the master brake cylinder and the at least one wheel brake can be controlled via a control inlet, during an anti-lock mode, out of the normal position into a throttling position, counter to the force of an opening spring. The throttle valve serves to limit brake pressure rise speeds in the wheel brake during an anti-lock mode. It is disadvantageous that upon termination of such an anti-lock mode, the throttle valve hinders the return flow of pressure fluid out of the wheel brake to the master brake cylinder. Brake pressure reductions are therefore delayed. A throttle valve and connected in accordance with the invention has a second control inlet, which communicates with the wheel brake. The wheel brake pressure, upon termination of braking with anti-lock operation, is used as control pressure for opening the throttle valve, which as a result reaches its normal open position earlier and faster.

6 Claims, 2 Drawing Sheets

HYDRAULIC ANTI-LOCK VEHICLE BRAKE SYSTEM FOR A VEHICLE

BACKGROUND OF THE INVENTION

The invention relates to a hydraulic vehicle brake system as defined hereinafter.

U.S. Pat. No. 4,936,637 discloses a hydraulic vehicle brake system with a hydraulically controllable throttle valve between the master brake cylinder, and two independently controllable anti-lock valve assemblies of two wheel brakes in one brake circuit. A second brake circuit of the vehicle brake system is embodied in the same way. The throttle valve has a control inlet and is controllable by means of an outlet pressure from a return pump, the inlet to which is connected to the anti-lock valve assembly. The disposition of only a single adjustable throttle valve for both anti-lock valve assemblies and their wheel brakes has the disadvantage that in the anti-lock mode, brake pressure increases in the two wheel brakes can proceed variously fast, depending on whether brake pressure increases are taking place in one or both wheel brakes simultaneously. Moreover, the known adjustable throttle valve is complicated in structure, and because of its construction it hinders a rapid brake pressure decrease in the wheel brakes whenever the brake pedal is rapidly released during an anti-lock mode.

A brake system known from U.S. Pat. No. 4,099,793 for a motorcycle has a hydraulically controllable 2/2-way valve, combined with a throttle, located between the master brake cylinder, which by way of example is manually controllable, and an anti-lock valve assembly; the control inlet of this 2/2-way valve likewise communicates with the outlet of a return pump. The open position of a the valve is effected by an opening spring. This combination of a 2/2-way valve and a separately disposed throttle also hinders rapid brake pressure reductions in the wheel brake.

OBJECT AND SUMMARY OF THE INVENTION

The vehicle brake system according to the invention has the advantage that, when a brake event is terminated, a pressure drop between the wheel brakes and the master brake cylinder rapidly directs the throttle valves to their normal open positions once an anti-lock mode is ended. Subsequently, the brake pressures of the wheel brakes decrease rapidly in the intended manner, so that good control and accordingly good maneuvering of the thus-equipped vehicle is possible.

The vehicle brake system has an advantage that the speed of a brake pressure rise in the anti-lock mode are dependent substantially only on the applicable pressure drop between the master brake cylinder and the applicable one of the two wheel brakes, in the event that each wheel brake is assigned its own anti-lock valve assembly. If both anti-lock valve assemblies are intended to provide for brake pressure rises in both wheel brakes simultaneously, an undesired retardation of a rise in brake pressure is avoided.

The defining features for a preferred embodiment of the anti-lock valve assemblies each comprising two 2/2-way valves, provide two different installation locations for the throttle valves.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
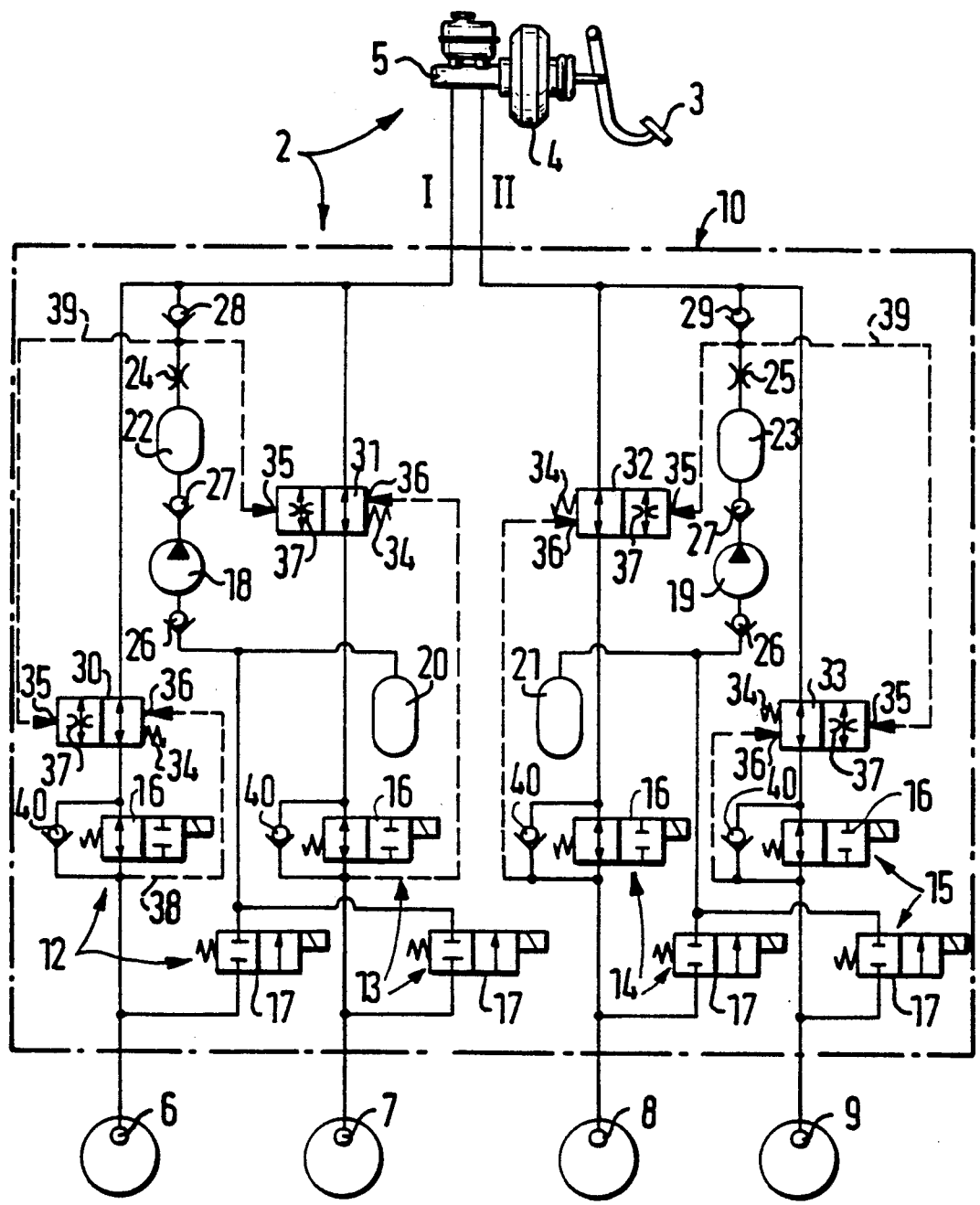
FIG. 1 schematically illustrates a vehicle brake system with a first option for disposing the throttle valves, and FIG. 2 likewise schematically shows a vehicle brake system, with a second option for disposing the throttle valves.

The exemplary embodiment shown in FIG. 1 of the vehicle brake system 2 according to the invention has a brake pedal 3, a brake booster 4, a master brake cylinder 5 with a first brake circuit I and a second brake circuit II, wheel brakes 6, 7, 8 and 9, and an anti-lock system lo located between the master brake cylinder 5 and the wheel brakes 6 to 9. Wheel brakes 6 and 7, which for instance are a left front wheel brake and a right rear wheel brake, belong to brake circuit I. Wheel brakes 8 and 9 logically belong to brake circuit II; the wheel brake 8 may be a left rear wheel brake, and wheel brake 9 may be a right front wheel brake. This distribution of the wheel brakes to the wheels is known as a K-type brake circuit distribution. However, how the brake circuits are distributed is of no importance to the invention.

One anti-lock valve assembly 12 to 15 is disposed between each of the wheel brakes 6 to 9 and the master brake cylinder 5. In the present exemplary embodiment, the anti-look valve assemblies 12 to 15 each comprise a first electrically controllable 2/2-way valve 16, which is open in the normal position and serves as a so-called brake pressure buildup valve. A respective second electrically controllable 2/2-way valve 17 is closed in its normal position and serves as a so-called brake pressure reduction valve. The 2/2-way valves 16 are each located between the wheel brakes 6 to 9 and the master brake cylinder 5. The 2/2-way valves 17 are connected to the wheel brakes 6 to 9. Deviating from the embodiment of the anti-lock valve assemblies 12 to 15 in the form of a combination of 2/2-way valves, naturally other anti-lock valve assemblies, embodied in the form of 3/2-way valves or 3/3-way valves, can also be used. Such valves can for instance be found in the prior art and therefore need not be described here.

Each of the brake circuits I and II includes a respective return pump 18 and 19, reservoir chamber 20 and 21, damper chamber 22 and 23, and damper throttle 24 and 25. Each return pump 18, 19 has one inlet one-way valve 26 and one outlet one-way valve 27. One reservoir chamber 20 or 21 and additionally one inlet one-way valve 26 of the applicable return pump 18 or 19 are connected to two 2/2-way valves 17 at a time of each of the brake circuits I and II. The outlet one-way valves 27 of the return pumps 18 and 19 lead to damper chambers 22, 23, which are followed by damper throttles 24 and 25, respectively. One-way check valves 28 and 29 are located between the damper throttles 24 and 25 of brake circuits I and II and the master brake cylinder 5. The anti-lock system 10 has hydraulically controllable throttle valves 30, 31, 32 and 33 in each brake circuit, between the master brake cylinder 5 and each of the anti-lock valve assemblies, 12 and 13 on the one hand and 14 and 15 on the other. Each of the throttle valves 30 to 33 has an opening spring 34 and each has a first hydraulic control inlet 35 and a second hydraulic control inlet 36. The first control inlets 35 of the throttle valves 3 and 31 communicate with the return pump 18 downstream of its damper throttle 24. In the same way, the first control inlets 35 of the throttle valves 32 and 33 are connected to these valves downstream of the damper throttle 25 and as a result can be supplied by the return pump 19. Throttles 37, which can be embodied in accordance with the general rules of hydraulics, are each accommodated in the throttle valves 30 to 33. The throttle valves 30 to 33 are embodied such that the applicable opening spring 34 can assure a free passage through them. The throttle valves 30 to 33 are also embodied such that by introducing hydraulic pressure into their first control inlets 35, the forces of the opening springs 34 can be overcome, so that the throttle valves 30 to 33 can assume their throttling positions. Additionally, and in a manner essential to the invention, these throttle valves 30 to 33 are embodied such that whenever pressures in the second control inlets 36 are higher than at the first control inlets 35, the actions of the opening springs 34, in the sense of returning the throttle valves 30 to 33 to their normal positions, are reinforced. Control pressures serving this purpose are wheel brake pressures that each derive from the respectively associated wheel brake 6, 7, 8 or 9. The control inlets 36 can therefore each be supplied via control lines 38 with pressures from the wheel brakes 6, 7, 8 or 9, as applicable. Further control lines 39, which are connected downstream of the damper throttle 24 or 25, are assigned to the first control inlets 35 of the throttle valves 30 to 33. These control lines 39 can be relieved of pressure toward the master brake cylinder 5 by means of the check valves 28 or 29. However, pressures from the master brake cylinder 5 are kept away from the control lines 39, by means of these check valves 28 and 29.

Each anti-lock valve assembly 12 to 15 is assigned a parallel safety bypass one-way valve 40. The safety bypass one-way valves 40 are embodied as check valves, which can be opened in the direction from the wheel brakes 6 to 9 to the master brake cylinder 5. The safety bypass valves 40 are intended to relieve the particularly associated wheel brake of a brake pressure, upon release of the brake pedal 3, in the event that the particular assigned 2/2-way valve 16 might reach its shutoff position and remain there from any malfunction, whether because it sticks there or from some electrical error in a control unit, not shown.

The vehicle brake system 2 according to the invention functions as follows:

In the normal state, the valves 16, 17, 28, 29, 30, 31, 32 and 33 assume the positions described and shown in the drawing. Upon an actuation of the brake pedal 3, for example with the joint aid of the brake booster 4, pressures arise in the master brake cylinder 5 and are propagated into the brake circuits I and II. Within these brake circuits I and II, the pressures reach the wheel brakes 6, 7, 8 and 9, through the throttles valves 30 to 33, which are in their open positions, and the anti-lock valves assemblies 12 to 15, or their brake pressure buildup valves embodied as 2/2-way valves 16. Upon release of the brake pedal, pressures in the master brake cylinder 5 decrease. Accordingly, the pressures of the wheel brakes 6 to 9 decrease, through the valves 30 to 33 and 16, which are in their open positions.

If the brake pedal 3 is actuated increasingly forcefully, so that a further increasing pressure in the master brake cylinder 5, via at least one of the wheel brakes 6 to 9, creates the risk of wheel locking at at least one associated vehicle wheel, not shown, then a control unit, not shown, assures that the particular one of the 2/2-way valves 16 that is assigned to a wheel threatening to lock is controlled to its closing position. If the control unit ascertains that a brake pressure reduction is necessary as well in order to avoid the danger of wheel locking, then it directs the 2/2-way valve 17 associated with the 2/2-way valve 16 addressed to its opening position. As a result, pressure fluid from the associated one of the wheel brakes 6 to 9 can flow out into at least one of the two reservoir chambers 20 or 21. No later than upon the opening of the 2/2-way valve 17, at least the following return pump 18 or 19 is switched on. Via its inlet valve 26, each of the return pumps 18 and 19 receives pressure fluid, which flows in through one of the two 2/2-way valves 17 and/or from the associated reservoir 20, 21. This pressure fluid is forced through the applicable outlet valve 27 into the following damper chamber 22 or 23, and it then leaves the damper chamber 22 o 23 through the following damper throttle 24 or 25. As a result, pressures arise upstream of the check valves 28 and 29 of brake circuits I and II that are loaded with the pressure from the master brake cylinder 5. The effect of these pressures, first via the control lines 39 and the first control inlets 35 of the throttle valves 30, 31 and 32, 33, is that these valves are reversed to their throttling positions. As a result, their throttles 37 are then located between the master brake cylinder 5 and the applicable wheel brake 6, 7, 8 and 9. If the pressure rising between the damper throttles 24 or 25 and the check valves 28 or 29 then finally reaches the pressure that prevails in the master brake cylinder 5, then the check valves 28 or 29 begin to open, and as a consequence of this quantities of pressure fluid pumped by the return pumps 18, 19 now flow back into the master brake cylinder 5. There, they are available for generating brake pressure rises in the wheel brakes 6, 7, 8 and 9.

Upon each initiated braking event, the brake pressure rising in the wheel brakes 6 to 9 is introduced through the control lines 38 into the second control connections 36 of the throttle valves 30 to 33. These control pressures reinforce the opening spring 34, so that pressures that are to be introduced into the wheel brakes 6 to 9 to generate wheel brake pressures can flow unhindered through the throttle valves 30 to 33 in the direction of the applicable wheel brake.

If the anti-lock mode already addressed and described above ensues, and the return pumps 18 and 19 then generate pressures that reach the control inlets 35 of these throttle valves 30 to 33, then these controlling pressures counteract the opening springs 34 and the control pressures of the associated second control inlets 36. The throttle valves 30 to 33 are embodied such that if there is a pressure equilibrium between the first control inlets 35 and the second control inlets 36, the opening springs 34 assure an unthrottled open position of the throttle valves 30 to 33. The effect of this is that upon a brake pressure reduction in the anti-lock mode by means of the 2/2-way valve 17, the control pressure in the associated control line 38 decreases, and consequently with the return pumps 18 and 19 switched on, the pressure prevailing in the control line 39 dominates, with the result that the applicable throttle valve is controlled to its throttling positions. As already indicated, the associated throttle 37 is therefore located between the master brake cylinder 5 and the following wheel brake 6. The same applies logically for the throttle valves assigned to the other wheel brakes. The throttle 37 in question, for example in the throttle valve 30, has the effect that after a closure of the associated 2/2-way valve 17 and the opening of the associated 2/2-way valve 16, a partial quantity of the pressure fluid available in the master brake cylinder 5 and kept under pressure is delivered, in retarded fashion, to the wheel brake 6. Accordingly in the anti-lock mode, brake pressure rises in the wheel brake 6 are reduced, in an intended manner. An abrupt engagement of the wheel brake 6 and possibly an overly rapid rise of the brake pressure, resulting in a renewed danger of wheel locking as well as erratic operation of the anti-lock system 10 are thereby avoided. This applies equally to the other wheel brakes 7, 8 and 9.

If a danger of wheel locking of at least one of the vehicle wheels is in principle eliminated by release of the brake pedal 3, then the control unit, not shown, assures that the electrically controllable valves 16 and 17 reach their basic positions and that the return pumps 18 and 19 are switched off. As a result of the pressure decreasing, for instance to zero, in the master brake cylinder 5, the check valves 28 and 29 open, so that pressures in the control lines 39 decrease as well. Correspondingly, the pressures in the control inlets 35 of the throttle valves 30 to 33 decrease as well. Since because of the throttles 37, the pressures in the wheel brakes 6 to 9 initially decrease more slowly than the pressure in the master brake cylinder 5, the control pressures that are operative via the control lines 38 in the second control inlets 36 are initially higher than the pressures that are present at the first control inlets 35. As a result, the variously high control pressures have the effect that the opening springs 34 are reinforced in the opening direction. In another words, in a manner essential to the invention, a pressure drop between the wheel brakes 6 to 9 and the master brake cylinder 5 upon termination of a braking event is utilized to control the throttle valves 30 to 33 rapidly back to their normal open positions once an anti-lock mode has been terminated. Afterward, brake pressures of the wheel brakes 6 to 9 decrease rapidly in an intended manner, which has the advantage that a vehicle equipped in this way can be controlled well and accordingly is readily maneuverable.

Figure 2:
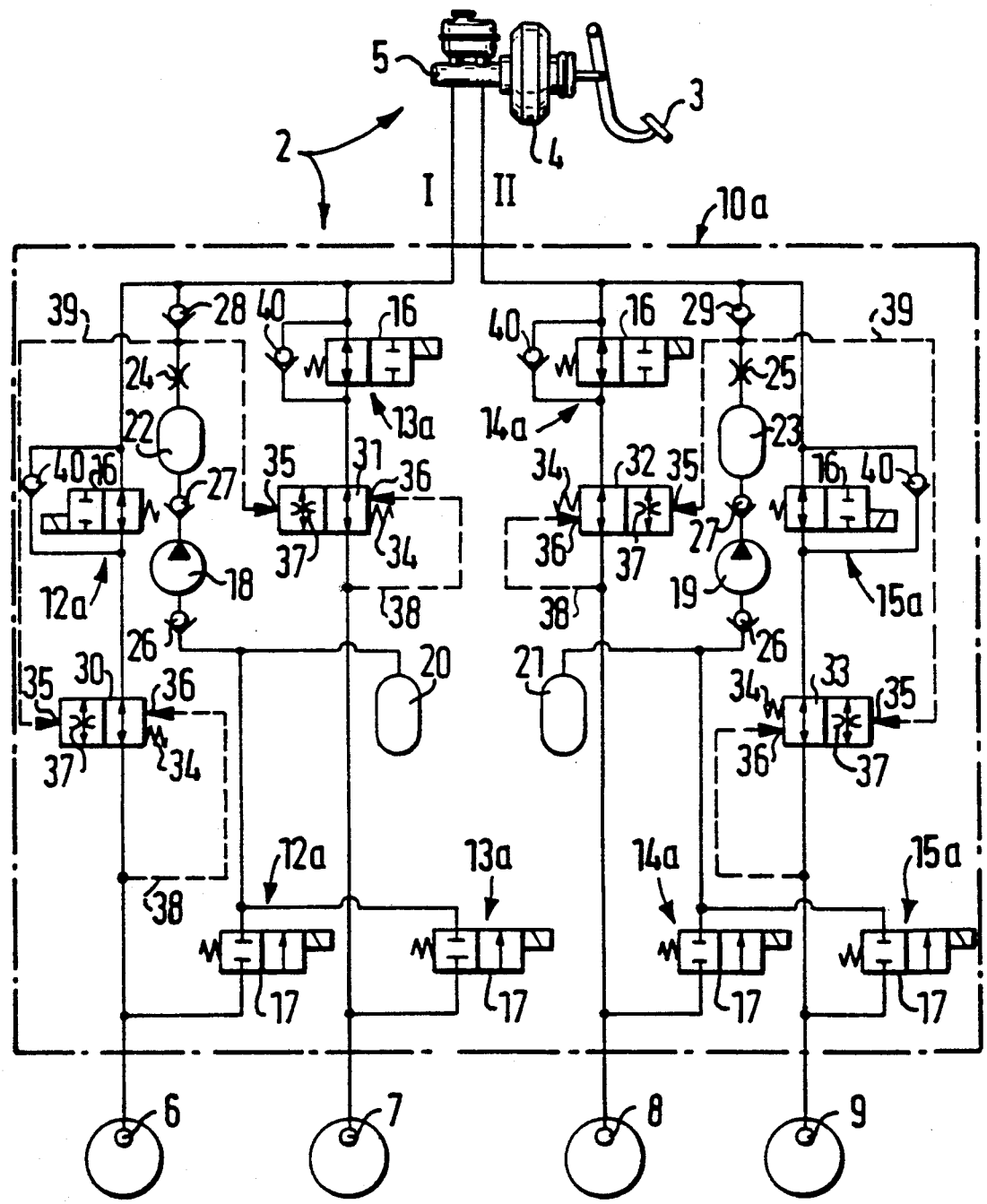

The second exemplary embodiment, shown schematically in FIG. 2, of a vehicle brake system 2 includes the brake pedal 3, the brake booster 4, the master brake cylinder 5 and the wheel brakes 6, 7, 8 and 9 of the first exemplary embodiment of FIG. 1, along with an anti-lock system 10a.

The anti-lock system 10a of FIG. 2 differs from the anti-lock system 10 of FIG. 1 in that the pairs of valves in series, 16, 30 and 16, 31 on the one hand, and 16, 32 and 16, 33 on the other, have a different order. In the example of FIG. 2, the master brake cylinder 5 in brake circuits I and II is followed first by the 2/2-way valves 16 and only then by the throttle valves 30, 31, 32 and 33. The 2/2-way valves 17, as in the example of FIG. 1, communicate with the wheel brakes 6, 7, 8 and 9. 2/2-way valves 16 and 2/2-way valves 17 assigned with one another to each wheel brake now form anti-lock valve assemblies 12a, 13a, 14a, 15a, because of the interposition of the applicable throttle valve 30, 31, 32 or 33.

A feature retained in this embodiment is that the first control inlets 35 can be supplied via lines 39 with outlet pressures of the return pumps 18 and 19, and that the pressures of the particular assigned wheel brake are supplied to the second control inlets 36 via control lines 38. In terms of the normal braking and anti-lock mode functions, with reversal of at least one of the throttle valves 30 to 33 to the throttling position there is no difference from the exemplary embodiment of the vehicle brake system 2 of FIG. 1. This is an indication that the use according to the invention of throttle valves with two control inlets in order to limit pressure rise speeds in wheel brakes during an anti-lock mode, and the triggering of the throttle valves on the one hand with the pressure from return pumps and on the other with pressure from wheel brake cylinders, is not bound to a particular embodiment of an anti-lock valve assembly and its individual elements. Accordingly, the exemplary embodiments of FIGS. 1 and 2 indicate that there are variable options in terms of the three-dimensional disposition of valves and throttle valves.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic vehicle brake system, having a master brake cylinder controllable by a vehicle operator, comprising at least one wheel brake that can be supplied with brake fluid from the master brake cylinder and an anti-lock system disposed between said master brake cylinder and said at least one wheel brake, said system has at least one anti-lock valve assembly between the master brake cylinder and said at least one wheel brake for modulating wheel brake pressures, a return pump with a pump inlet that is connected to the at least one anti-lock valve assembly and a pump outlet that communicates with the master brake cylinder, and a throttle valve located between the master brake cylinder and the at least one wheel brake, said throttle valve has an open position controlled by a control spring and a first control inlet connected to the pump outlet of the return pump for reversal of the throttle valve to a throttling position for relief of pressure to the master brake cylinder via a check valve that can be opened toward the master brake cylinder, the throttle valve (30, 31, 32, 33) has a second control inlet (36) which is connected to said at least one wheel brake (6, 7, 8, 9), and that the throttle valve (30, 31, 32, 33) is arranged such that a pressure supplied to the second control inlet (36) from the at least one wheel brake (6, 7, 8, 9) reinforces the control spring (34) to operate said throttle valve to the open position.

2. A hydraulic vehicle brake system as defined by claim 1, wherein there is more than one anti-lock valve assembly and each anti-lock valve assembly (12, 13, 14, 15, 12a, 13a, 14a, 15a) is assigned its own throttle valve (30, 31, 32, 33).

3. A hydraulic vehicle brake system as defined by claim 2, in which each anti-lock valve assembly (12) comprises a first electrically controllable 2/2-way valve (16), which in a normal position is open and forms a brake pressure buildup valve, and a second electrically controllable 2/2-way valve (17), which is closed in a normal position and forms a brake pressure reduction valve, and that its throttle valve (30) is disposed between the brake pressure buildup valve (16) and the master brake cylinder (5).

4. A hydraulic vehicle brake system as defined by claim 2, in which each anti-lock valve assembly (12a) comprises a first electrically controllable 2/2-way valve (16), which in a normal position is open and forms a brake pressure buildup valve, and a second electrically controllable 2/2-way valve (17), which is closed in a normal position and forms a brake pressure reduction valve, and that its throttle valve (30) is disposed between the brake pressure buildup valve (16) and the wheel brake (6).

5. A hydraulic vehicle brake system as defined by claim 1, in which the at least one anti-lock valve assembly (12) comprises a first electrically controllable 2/2-way valve (16), which in a normal position is open and forms a brake pressure buildup valve, and a second electrically controllable 2/2-way valve (17), which is closed in a normal position and forms a brake pressure reduction valve, and that the throttle valve (30) is disposed between the brake pressure buildup valve (16) and the master brake cylinder (5).

6. A hydraulic vehicle brake system as defined by claim 1, in which at least one anti-lock valve assembly (12a) comprises a first electrically controllable 2/2-way valve (16), which in a normal position is open and forms a brake pressure buildup valve, and a second electrically controllable 2/2-way valve (17), which is closed in a normal position and forms a brake pressure reduction valve, and that the throttle valve (30) is disposed between the brake pressure buildup valve (16) and the wheel brake (6).

* * * * *